US012601841B2

(12) United States Patent
Frey et al.

(10) Patent No.: US 12,601,841 B2
(45) Date of Patent: Apr. 14, 2026

(54) FMCW HETERODYNE-DETECTION LIDAR IMAGER SYSTEM WITH IMPROVED DISTANCE RESOLUTION

(71) Applicant: Commissariat à l'Energie Atomique et aux Energies Alternatives, Paris (FR)

(72) Inventors: Laurent Frey, Grenoble Cedex (FR); Anis Daami, Grenoble Cedex (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 809 days.

(21) Appl. No.: 17/933,284

(22) Filed: Sep. 19, 2022

(65) Prior Publication Data

US 2023/0097296 A1 Mar. 30, 2023

(30) Foreign Application Priority Data

Sep. 30, 2021 (FR) ..................................... 21 10310

(51) Int. Cl.
$G01S\ 17/89$ (2020.01)
$G01S\ 7/481$ (2006.01)
(Continued)

(52) U.S. Cl.
CPC ............ *G01S 17/89* (2013.01); *G01S 7/4816* (2013.01); *G01S 7/4917* (2013.01); *G01S 17/34* (2020.01); *H04N 23/56* (2023.01)

(58) Field of Classification Search
CPC ........ G01S 17/89; G01S 7/4816; H04N 23/56
(Continued)

(56) References Cited

U.S. PATENT DOCUMENTS 6,646,723 B1 * 11/2003 Dubovitsky .......... G01S 7/4915
356/485
2018/0210068 A1 * 7/2018 Efimov .................. H04B 10/60
(Continued)

FOREIGN PATENT DOCUMENTS

CN 111289994 A * 6/2020

OTHER PUBLICATIONS

French Preliminary Search Report issued Jun. 13, 2022 in French Application 21 10310, filed on Sep. 30, 2021 (with English Translation of Categories of cited documents and Written Opinion), 12 pages.

*Primary Examiner* — Robert W Hodge
*Assistant Examiner* — Kara Richter
(74) *Attorney, Agent, or Firm* — Oblon, McClelland, Maier & Neustadt, L.L.P.

(57) ABSTRACT

The invention relates to a FMCW lidar imager system with improved distance resolution. The imager system 1 comprises a reflector 42 configured to reflect, in the direction of the scene 2, a portion $S_{or,nc}$ of the backscattered object signal $S_{or}$, which portion has not been collected by the collecting optical element 41. Thus, the collected portion $S_{or,c}$ of the backscattered object signal $S_{or}$ is formed from first light beams $S_{or,c(1)}$ that have not been reflected by the reflector 42 and from light beams $S_{or,c(2)}$ that have been reflected by the reflector 42. The heterodyne signal $S_h$ therefore has a principal component $S_{h(1)}$ associated with the light beams $S_{or,c(1)}$, and a secondary component $S_{h(2)}$ associated with the light beams $S_{or,c(2)}$. The processing unit 60 is configured to determine the distance $z_{sc}$ of the scene 2 on the basis of a beat frequency $f_{b(2)}$ of the secondary component $S_{h(2)}$ of the heterodyne signal $S_h$.

13 Claims, 9 Drawing Sheets

(51) Int. Cl.
    *G01S 7/4912*     (2020.01)
    *G01S 17/34*     (2020.01)
    *H04N 23/56*     (2023.01)

(58) Field of Classification Search
    USPC ........................................................... 356/4
    See application file for complete search history.

(56)           References Cited

U.S. PATENT DOCUMENTS

| 2019/0064358 A1* | 2/2019 | Desai | G01S 7/4911 |
|---|---|---|---|
| 2019/0219683 A1* | 7/2019 | Fang | G01S 13/93 |
| 2019/0383940 A1* | 12/2019 | Hebert | G01J 3/0205 |
| 2020/0011994 A1* | 1/2020 | Thorpe | G01S 17/34 |
| 2020/0300993 A1* | 9/2020 | Behzadi | G01S 17/34 |
| 2021/0255293 A1* | 8/2021 | Kryvobok | G01S 7/4815 |
| 2022/0082697 A1* | 3/2022 | Slotwinski | G02B 27/141 |
| 2022/0206148 A1* | 6/2022 | Philipp | G01S 7/4817 |
| 2022/0291381 A1* | 9/2022 | Kurz | G01S 17/36 |

* cited by examiner

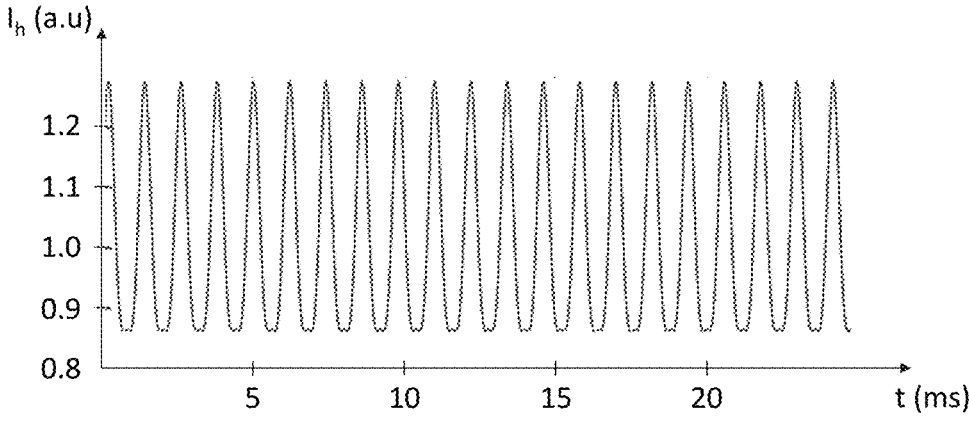
Fig.4A
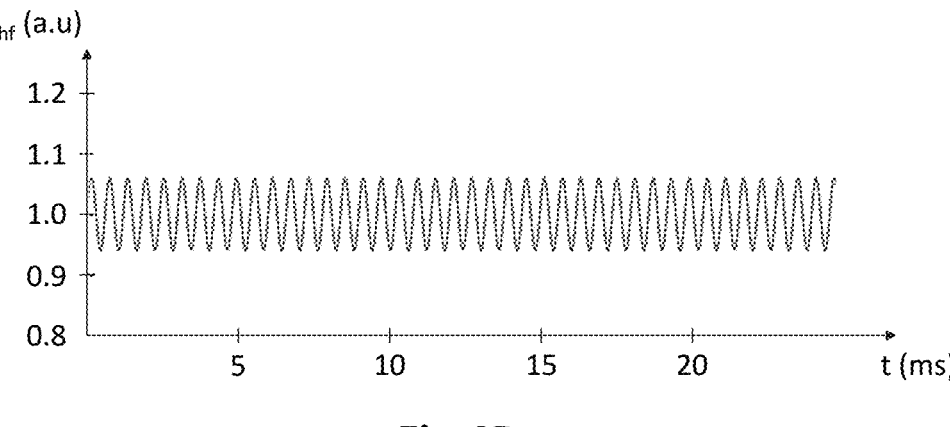
Fig.4B
Fig.4C

41

42

41    42

41    42

50    51    42

42    42.2    42.1

FMCW HETERODYNE-DETECTION LIDAR IMAGER SYSTEM WITH IMPROVED DISTANCE RESOLUTION

TECHNICAL FIELD

The field of the invention is that of frequency-modulated continuous wave (FMCW) heterodyne-detection lidar imager systems.

PRIOR ART

FMCW heterodyne-detection lidar imager systems allow a distance of a scene illuminated by a coherent optical signal to be determined. Such an imager system is based on the principle of heterodyne detection, in the sense that use is made of the properties of a heterodyne signal formed by the interference between a reference signal and a signal backscattered by the scene. These two optical signals are mutually coherent and originate from the same optical signal, called the primary signal, which is emitted by an optical source. Documents US 2020/300993 A1, US 2019/064358 A1, et US 2020/011994 A1 describe various examples of FMCW lidar imager systems.

In this regard, document WO2021/144357A1 describes an example of such an imager system, here called a flash imager system in that it is configured to illuminate a plurality of points of the scene simultaneously and to determine therefrom a distance map (distance image).

FIG. 1 is a schematic and partial view of such an imager system 1. It comprises at least:

an optical source 10 of what is called the primary signal $S_p$, which is coherent, frequency-modulated and continuous-wave;

a splitting and recombining optical device 20, which comprises a splitting optical element 21 configured to divide the primary signal $S_p$ into an object signal $S_o$ directed toward the scene 2 and into a reference signal $S_r$ directed toward a photodetector 50; an optical element 22 for shaping the reference signal $S_r$; and a recombining optical element 23 configured to direct toward the photodetector 50, along the same optical axis, the reference signal $S_r$ and a portion $S_{or,c}$ of the backscattered object signal $S_{or}$;

a projecting optical device 30, which is configured to project the object signal $S_o$ with a view to illuminating the whole scene 2 simultaneously;

an imaging optical device 40, which is configured to transmit the collected portion $S_{or,c}$ of the backscattered object signal $S_{or}$ and to form the image of the illuminated scene 2 in the detection plane of the photodetector 50. It comprises a collecting optical element that collects the light beams defining the portion $S_{or,c}$ of the backscattered object signal $S_{or}$;

the photodetector 50, here a matrix-array photodetector, which is configured to receive the collected portion $S_{or,c}$ of the backscattered object signal $S_{or}$ and the reference signal $S_r$, which interfere to form a heterodyne signal $S_h$ having a beat frequency $f_b$;

a processing unit 60, which is configured to determine a distance $z_{sc}$ (and here a distance map) of the scene 2 on the basis of the beat frequency $f_b$ of the heterodyne signal $S_h$.

The primary signal $S_p$ is chirped, i.e. exhibits an instantaneous frequency variation, with for example a starting frequency $f_0$ and a variation in value B over a period T. The chirped primary signal $S_p$ is a sinusoidal wave the instantaneous frequency of which varies over time, here linearly.

The photodetector 50 thus receives the collected portion $S_{or,c}$ of the backscattered object signal $S_{or}$, which is an attenuated and delayed replica of the object signal $S_o$, with a delay $\tau$. The delay results in a frequency difference $f_b$ between the two signals in the interval [$\tau$; T], with T<<T, that is between the reference signal $S_{or}$ and the backscattered and collected object signal $S_{or,c}$. The delay T is equal to about $2z_{sc}/c$ when the path travelled by the reference signal $S_r$ is neglected, where c is the speed of light in vacuum. This frequency $f_b$, which is called the beat frequency, is equal to the difference between the frequency of the reference signal $S_r$ and the backscattered and collected object signal $S_{or,c}$. Its value may be determined in the time domain by counting the number of oscillations in the heterodyne signal $S_h$ over the period T, or in the frequency domain via fast Fourier transform.

It is then possible to determine, on the basis of the value of this beat frequency $f_b$, the distance $z_{sc}$ between the illuminated scene 2 and the matrix-array photodetector 50. Specifically, given that $f_b/B=\tau/T$, and that $\tau=2z_{sc}/c$, the distance $z_{sc}$ of the scene may then be determined using the relationship: $z_{sc}\approx f_b cT/2B$, with a distance resolution $\Delta z_{sc}=c/2B$. The distance resolution $\Delta z_{sc}$ is defined as being the smallest difference in distance that the imager system is capable of measuring between two successive positions of a given object of the scene or between two laterally separate objects. By way of example, for a chirp B of 7.5 GHz, the distance resolution $\Delta z_{sc}$ is equal to 2 cm.

There is however a need to provide an imager system having an improved distance resolution. To do so, one approach would be to increase the value of the chirp B, which is conventionally produced by moving one of the reflectors of the laser cavity, for example via the piezoelectric effect, or by modulating the injection current of the laser source. However, such an increase in the value of the chirp may notably lead to errors in the determined value of the beat frequency $f_b$ and therefore in the determined value of the distance $z_{sc}$, notably because of non-linearity in the chirp and/or of a modulation of the optical power of the laser source induced by the modulation of the injected current. One alternative, as described in the document Aflatouni et al. titled Nanophotonic coherent imager, Opt. Express 23 (4), 5117-5125 (2015), would be to increase the resolution of the measurement of the beat frequency $f_b$, for example by counting a decimal number of oscillations in the heterodyne signal $S_h$ over the period T, but this would amount to complexifying the electronics of the processing unit.

SUMMARY OF THE INVENTION

The objective of the invention is to at least partially rectify the drawbacks of the prior art, and more particularly to provide an FMCW heterodyne-detection lidar imager system the distance resolution of which is improved without degrading the performance of the imager system or complexifying the processing electronics.

To do so, the subject of the invention is an FMCW lidar imager system, comprising:

a coherent light source, which is configured to emit a frequency-modulated continuous-wave primary signal $S_p$;

a splitting and recombining optical device, which is configured to split the primary signal $S_p$ into a reference signal $S_r$ that is directed toward a photodetector and into an object signal $S_o$ that is directed toward the scene, which backscatters a portion of the object signal $S_o$, which portion is called the backscattered object signal $S_{or}$; and configured to direct toward the photodetector, along the same optical axis, the reference signal $S_r$ and a portion $S_{or,c}$ of the backscattered object signal $S_{or}$, which portion is collected by a collecting optical element;

the collecting optical element, which is configured to collect the portion $S_{or,c}$ of the backscattered object signal $S_{or}$;

the photodetector, which is intended to receive the reference signal $S_r$ and the collected portion $S_{or,c}$ of the backscattered object signal $S_{or,c}$, which interfere to form a heterodyne signal $S_h$;

a processing unit, which is configured to determine the distance $z_{sc}$ of the scene on the basis of a beat frequency of the heterodyne signal $S_h$.

According to the invention, the imager system comprises a reflector configured to reflect, in the direction of the scene, a portion $S_{or,nc}$ of the backscattered object signal $S_{or}$, which portion is not collected by the collecting optical element. Thus, the collected portion $S_{or,c}$ of the backscattered object signal $S_{or}$ is formed from first light beams $S_{or,c(2)}$ that have not been reflected by the reflector and from second light beams $S_{or,c(2)}$ that have been reflected by the reflector and then by the scene. The heterodyne signal $S_h$ therefore has a principal component $S_{h(1)}$ associated with said first light beams $S_{or,c(1)}$, and a secondary component $S_{h(2)}$ associated with said second light beams $S_{or,c(2)}$. The processing unit is configured to determine the distance $z_{sc}$ of the scene on the basis of a beat frequency $f_{b(2)}$ of the secondary component $S_{h(2)}$ of the heterodyne signal $S_h$.

Let us note here that the second light beams $S_{or,c(2)}$, having been reflected by the reflector, belong to the collected part $S_{or,c}$ of the backscattered object signal $S_{or}$, and that this backscattered object signal $S_{or}$ is a signal backscattered by the scene. It is then understood that the second light beams $S_{or,c(2)}$ have been reflected by the scene before being collected.

The following are certain preferred but non-limiting aspects of this imager system.

The reflector may be retroreflective, so as to reflect incident light beams in the direction of the scene along an axis of reflection identical to their axis of incidence.

The reflector may have a lateral edge located at a maximum distance $r_{max}$ from an optical axis of the collecting optical element. It may be dimensioned so that the maximum distance $r_{max}$ is smaller than $\sqrt{(cz_{sc}/2B)}$ when the reflector is retroreflective, where c is the speed of light in vacuum, and B is a variation in the frequency of the primary signal $S_p$ over one period T of the modulation. It may be dimensioned so that the maximum distance $r_{max}$ is smaller than $\sqrt{(cz_{sc}/6B)}$ when the reflector is not retroreflective.

The reflector may be located in the plane of the collecting optical element.

The reflector may be located downstream of the collecting optical element, at the level of the photodetector.

In general, the reflector may be formed of a continuously reflective or retroreflective surface, or may be formed of non-contiguous reflective or retroreflective surfaces separated from each other by a surface transparent or reflective to the wavelength of the optical signals of interest.

The reflector may be located upstream of the collecting optical element and have a collection optical axis passing through it, the reflector then being formed from reflective or retroreflective areas that are separate from one another and that are encircled by an area that is transparent to the wavelength of the primary signal $S_p$.

The reflector may comprise a central area that is passed through by the collection optical axis, in which central area reflective or retroreflective areas that are separate from one another and that are encircled by a transparent area are formed, and a peripheral area that encircles the central area, in which peripheral area the reflective or retroreflective areas are joined to one another.

The imager system may be configured to illuminate only one point of the scene. As a variant, it may be configured to simultaneously illuminate a plurality of points of the scene and then to comprise an optical device for projecting the object signal $S_o$ onto the scene with a view to simultaneously illuminating the plurality of points of the scene, and an imaging optical device configured to form an image of the illuminated scene in the plane of the photodetector.

The processing unit may determine the beat frequency $f_{b(2)}$ by counting the oscillations in the second component $S_{or,c(2)}$ of the heterodyne signal $S_h$.

The processing unit may be configured to determine a beat frequency $f_{b(1)}$ of the principal component $S_{h(1)}$ of the heterodyne signal $S_h$, then to apply, to the heterodyne signal $S_h$, a bandpass filter that excludes the determined beat frequency $f_{b(1)}$ with a view to obtaining the secondary component $S_{h(2)}$, and lastly to determine the beat frequency $f_{b(2)}$ of the secondary component $S_{h(2)}$. The beat frequency $f_{b(1)}$ of the principal component $S_{h(1)}$ of the heterodyne signal $S_h$ may be determined by counting the oscillations in the heterodyne signal $S_h$.

The processing unit may determine the beat frequency $f_{b(2)}$ via Fourier transform applied to the heterodyne signal $S_h$.

The imager system may have what is called a mono-static configuration in which an optical axis of illumination of the scene by the object signal $S_o$ is identical to a collection optical axis of the collecting optical element. It may then comprise a mirror toward which the reference signal $S_r$ is directed by a splitting optical element of the splitting and recombining optical device.

The imager system may have what is called a bi-static configuration in which an optical axis of illumination of the scene by the object signal $S_o$ is different from a collection optical axis of the collecting optical element.

BRIEF DESCRIPTION OF THE DRAWINGS

Other aspects, aims, advantages and features of the invention will become more clearly apparent on reading the following detailed description of preferred embodiments thereof, which description is given by way of non-limiting example and with reference to the appended drawings, in which:

FIGS. 4A to 4C illustrate a numerical example of determination of the main and secondary beat frequencies $f_{b(1)}$ and $f_{b(2)}$ of the heterodyne signal $S_h$, FIG. 4A showing the heterodyne signal $S_h$, FIG. 4B showing the component $S_{h(2)}$ associated with the second echo $S_{or,c(2)}$, and FIG. 4C showing spectral power density and allowing the beat frequencies $f_{b(1)}$ and $f_{b(2)}$ to be seen;

DETAILED DESCRIPTION OF PARTICULAR EMBODIMENTS

In the figures and in the remainder of the description, the same references have been used to designate identical or similar elements. In addition, the various elements are not shown to scale for the sake of clarity of the figures. Moreover, the various embodiments and variants are not mutually exclusive and may be combined with one another. Unless indicated otherwise, the terms "substantially", "about" and "of the order of" mean to within 10%, and preferably to within 5%. Moreover, the terms "comprised between . . . and . . . " and equivalents mean inclusive of limits, unless indicated otherwise.

The invention relates to a frequency-modulated continuous wave (FMCW) heterodyne-detection lidar imager system allowing a distance $z_{sc}$ of a scene, or even a distance map $z_{sc(i,j)}$ (distance image), to be determined with an improved distance resolution $\Delta z_{sc}$.

The imager system is called a lidar imager system (lidar being the acronym of light detection and ranging) in that a coherent optical signal is used to determine a distance $z_{sc}$ of a point of the scene or a distance map $z_{sc(i,j)}$ of the scene. In the context of the invention, the imager system may be either of single-point type, in the sense that the object signal illuminates only one point of the scene, possibly with a spatial scan of the scene by the object signal, or of flash type, in the sense that the object signal simultaneously illuminates a plurality of points of the scene and in the sense that the imager system acquires the image of the scene with a view to determining a distance map therefrom.

In addition, the imager system is said to be a heterodyne-detection imager system in that, to determine the distance of the illuminated scene, a so-called beat frequency of a heterodyne signal formed by interference between a reference signal of a local oscillator and a signal backscattered by the illuminated scene is determined, these two optical signals being mutually coherent. Specifically, the reference signal and the signal projected onto the scene both originate from the same primary optical signal emitted by the optical source. Finally, the heterodyne detection is FMCW heterodyne detection in that the primary optical signal is a frequency-modulated, continuous-wave signal.

Figure 2A:
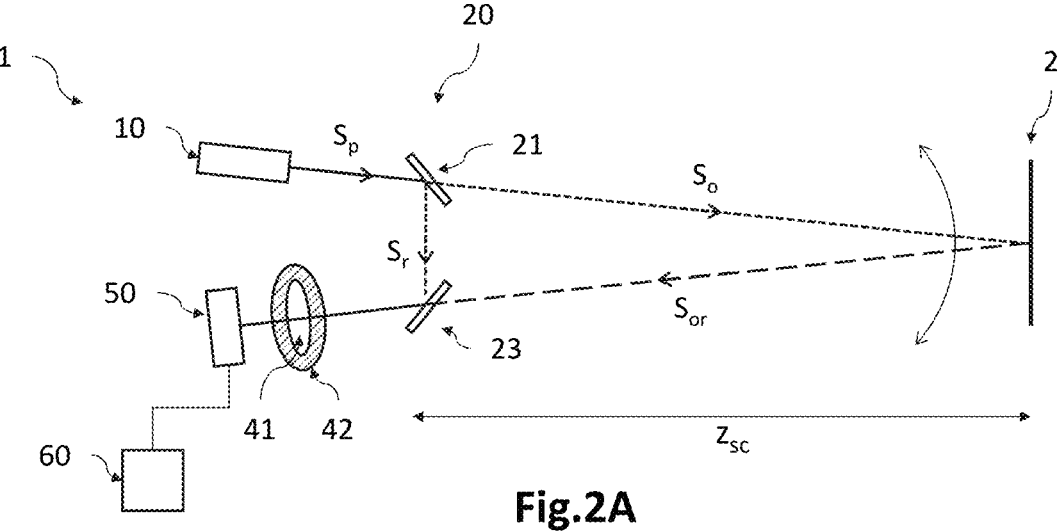
FIGS. 2A and 2B are schematic and partial views of imager systems according to some embodiments, one being of single-point type (FIG. 2A) and the other of flash type (FIG. 2B)
Figure 2B:
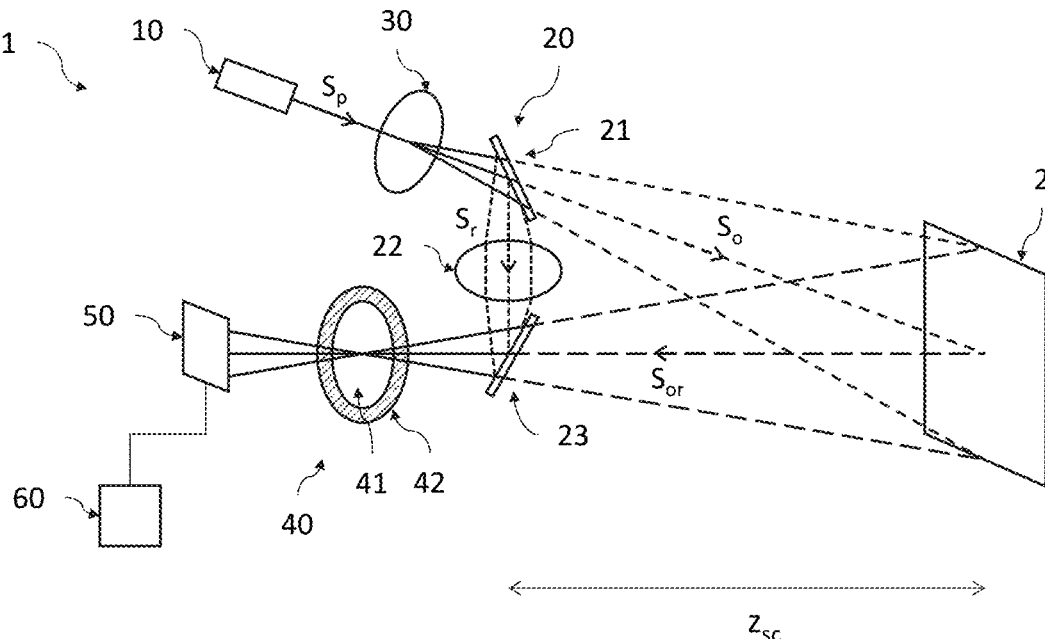

FIGS. 2A and 2B are schematic and partial views of an FMCW heterodyne-detection lidar imager system according to some variant embodiments, in which one corresponds to a single-point imager system, and the other corresponds to a flash imager system. The figures are highly schematic: the scene is planar here, but in fact it may obviously not be.

Generally, the imager system 1 comprises at least:
coherent light source 10, which is configured to emit a coherent, frequency-modulated, continuous-wave primary signal $S_p$;
splitting and recombining optical device 20, comprising:
at least one splitting optical element 21 configured to split the primary signal $S_p$ into a reference signal $S_r$ directed toward a photodetector 50 and into an object signal $S_o$ directed toward the scene 2, which backscatters a portion of the object signal $S_o$, which portion is called the backscattered object signal $S_{or}$;
at least one recombining optical element 23 configured to direct toward the photodetector 50, along the same optical axis, the reference signal $S_r$ and a portion $S_{or,c}$ of the backscattered object signal $S_{or}$, which portion is collected or intended to be collected by a collecting optical element 41;
a collecting optical element 41, which is configured to collect the portion $S_{or,c}$ of the backscattered object signal $S_{or}$;
the photodetector 50, which is intended to receive the reference signal $S_r$ and the collected portion $S_{or,c}$ of the backscattered object signal $S_{or}$, which interfere to form a heterodyne signal $S_h$;
a processing unit 60, which is configured to determine a distance $z_{sc}$ of the scene 2 on the basis of a beat frequency of the heterodyne signal $S_h$.

To improve the distance resolution of the imager system 1, the latter further comprises a reflector 42 configured to reflect in the direction of the scene 2 a portion $S_{or,nc}$ of the backscattered object signal $S_{or}$, which portion is not collected by the collecting optical element 41. Thus, the collected portion $S_{or,c}$ of the backscattered object signal $S_{or}$ is formed from first light beams $S_{or,c(1)}$ of the backscattered object signal $S_{or}$ that have not been reflected by the reflector 42 and from second light beams $S_{or,c(2)}$ of the backscattered object signal $S_{or}$ that have been reflected by the reflector 42. As a result, the heterodyne signal $S_h$ has a principal component $S_{h(1)}$ associated with the first light beams $S_{or,c(1)}$, and a secondary component $S_{h(2)}$ associated with the second light beams $S_{or,c(2)}$. The principal component $S_{h(1)}$ has a beat frequency $f_{b(1)}$, and the secondary component $S_{h(2)}$ has a beat frequency $f_{b(2)}$ different from $f_{b(1)}$.

In addition, the processing unit 60 is configured to determine the distance $z_{sc}$ of the scene 2 on the basis of the beat frequency $f_{b(2)}$ of the secondary component $S_{h(2)}$ of the heterodyne signal $S_h$. On so doing, as described in detail below, the distance $z_{sc}$ is determined with a distance resolution $\Delta z_{sc}$ that is improved by a factor of 2 with respect to the conventional situation in which the distance $z_{sc}$ is determined on the basis of the beat frequency $f_{b(1)}$ alone.

FIG. 2A illustrates an imager system 1 according to a single-point embodiment. Thus, the object signal $S_o$ illuminates only one point of the scene 2 at a time, and the photodetector 50 may be a photodiode. The imager system 1 is therefore configured to determine the distance $z_{sc}$ of the illuminated point of the scene 2. It should be noted that the imager system 1 may be configured to spatially scan the scene 2 with the object signal $S_o$, point by point.

The imager system 1 comprises an optical source 10 of what is called a primary signal $S_p$, which is coherent, frequency-modulated and continuous-wave. The optical source 10 is preferably a laser source that emits the primary signal $S_p$. By way of example, the primary signal $S_p$ may have an optical frequency located in the infrared. In addition, the primary signal $S_p$ is frequency-modulated, for example linearly here, from a starting frequency $f_0$ over a repetition period T with a bandwidth B (chirp). The signal is here a chirped signal, that is to say a sinusoidal wave the instantaneous frequency of which varies linearly over time.

The optical source 10 has a coherence length that is typically longer than the optical path difference between the reference channel and the object channel. The reference channel is the path followed by the reference signal $S_r$ between the optical source 10 and the photodetector 50. The object channel is the path followed by the object signal $S_o$ from the optical source 10 to the scene 2, and the path followed by the object signal $S_{or}$ backscattered by the scene to the photodetector 50. This optical path difference may correspond, to the first order, to twice the maximum distance between the imager system 1 and the scene 2.

The optical source 10 may thus comprise, in the case of emission in the near-infrared region (between 0.7 and 2 μm), a VCSEL source 11 (VCSEL standing for vertical-cavity surface-emitting laser), VCSELs generally having a coherence length of the order of one meter, or even an EEL source 11 (EEL standing for edge-emitting laser), which may have a coherence length of the order of around ten or even one hundred meters.

The imager system 1 comprises a splitting/recombining optical device 20. The latter comprises at least one splitting optical element 21 configured to split the primary signal $S_p$ into an object signal $S_o$ on the one hand and into a reference signal $S_r$ on the other hand. The reference signal $S_r$ corresponds, in the context of heterodyne detection, to the signal of a local oscillator (LO). It also comprises at least one recombining optical element 23 configured to direct toward the photodetector 50, along the same optical axis, in such a way as to spatially superpose them at least partially, the reference signal $S_r$ and a collected portion $S_{or,c}$ of the backscattered object signal $S_{or}$.

The splitting optical element 21 may be, for example, a semi-reflective plate or a splitter cube. Here, a semi-reflective plate 21 transmits a portion of the primary signal $S_p$, which becomes the object signal $S_o$, and reflects a portion of the primary signal $S_p$, which becomes the reference signal $S_r$. The distribution of intensity between the object signal $S_o$ and the reference signal $S_r$ is preferably not equal, and may thus be 90% to the object signal $S_o$ and 10% to the reference signal $S_p$.

The recombining optical element 23 is therefore configured to direct in the direction of the photodetector 50, along the same optical axis, the backscattered optical signal $S_{or}$ and the reference signal $S_r$. It may be a question of a semi-reflective plate or of a combiner cube. Here, a semi-reflective plate 23 reflects the reference signal $S_r$ in the direction of the photodetector 50, along an optical axis passing through the center of the semi-reflective plate 23 and through the center of the photodetector 50, and transmits the backscattered object signal $S_{or,c}$ along the same optical axis. The two optical signals therefore propagate in the direction of the matrix-array photodetector 50 over a common channel, along the same optical axis.

The optical device 20 is configured to ensure an (at least partial) spatial superposition of the two optical signals $S_r$ and $S_{or}$ along the same optical axis, thus improving the combination of the two optical signals via interference, this allowing the amplitude of the heterodyne signal to be improved $S_h$. To do so, optical elements for shaping the optical signals (which elements are not shown here) may be provided, as is described in the aforementioned document WO2021/144357A1.

The imager system 1 comprises at least one optical element 41 for collecting a portion $S_{or,c}$ of the backscattered object signal $S_{or}$, this portion $S_{or,c}$ then being received by the photodetector 50. It may be a free-space optical element, and it may be an aperture diaphragm that defines the physical pupil. The aperture diaphragm may be defined by the outline of a focusing lens. The collecting optical element may, moreover, be formed from a plurality of lenses between which the aperture diaphragm is placed. The collecting optical element 41 may be located upstream or downstream of the recombining optical element 23. As a variant, the collecting optical element 41 may not be a dedicated optical object, but instead be defined by the sensing area of the photodetector 50, notably in the case of a single-point imager system 1.

According to the invention, the imager system 1 comprises a reflector 42 configured to reflect, in the direction of the scene 2, a portion, denoted $S_{or,nc}$, of the backscattered object signal $S_{or}$, which portion has not been collected by the collecting optical element 41. The reflector 42 is here a specular reflector, in the sense that it reflects the light beams non-diffusely or almost non-diffusely. The reflector 42 may be located at the collecting optical element 41, for example by being coplanar therewith, or be located upstream or downstream. As described below, it may also be located by the photodetector 50.

As described below, the reflector 42 may be simply reflective, i.e. reflect incident light beams in accordance with Snell's law of reflection, or be retroreflective, i.e. the light beams are reflected along an axis of reflection identical to the axis of incidence. In this regard, the reflector 42 may be a corner-cube retroreflector or a layer of microbeads, as notably described in document WO2015/158999A1.

The recombining optical element 23 may be located upstream or downstream of the collecting optical element 41 and of the reflector 42. In the case where it is located upstream, the reference signal $S_r$ is preferably oriented so as to pass through only the collecting optical element 41 and not to be incident on the reflector 42. It is thus not reflected by the reflector 42, as if it were it could induce additional interference with a backscattered object signal $S_{or}$ at beat frequencies different from the frequencies $f_{b(1)}$ and $f_{b(2)}$. Moreover, placing the recombining optical element 23 upstream allows the collecting optical element 41 and the reflector 42 to be placed as close as possible to the photodetector 50, this increasing the field of view of the imager system 1.

The imager system 1 further comprises a photodetector 50, which is here a photodiode (or for example a pair of balanced photodiodes) insofar as the imager system 1 is of 'single-point' type. It receives the reference signal $S_r$ and the collected portion $S_{or,c}$ of the backscattered object signal $S_{or}$, which signals interfere with each other to form a heterodyne signal $S_h$ that has a principal beat frequency $f_{b(1)}$ and, as described in detail below, a secondary beat frequency $f_{b(2)}$.

The imager system 1 comprises a processing unit 60 configured to determine the distance $z_{sc}$ of the illuminated point of the scene 2 on the basis of a beat frequency of the heterodyne signal $S_h$ received by the photodetector 50, and more precisely on the basis of the beat frequency $f_{b(2)}$.

Before detailing the operation of the imager system 1 and expounding the improvement in distance resolution $\Delta z_{sc}$, it will be noted that the invention also covers the flash-mode configuration of the imager system 1.

Figure 1:
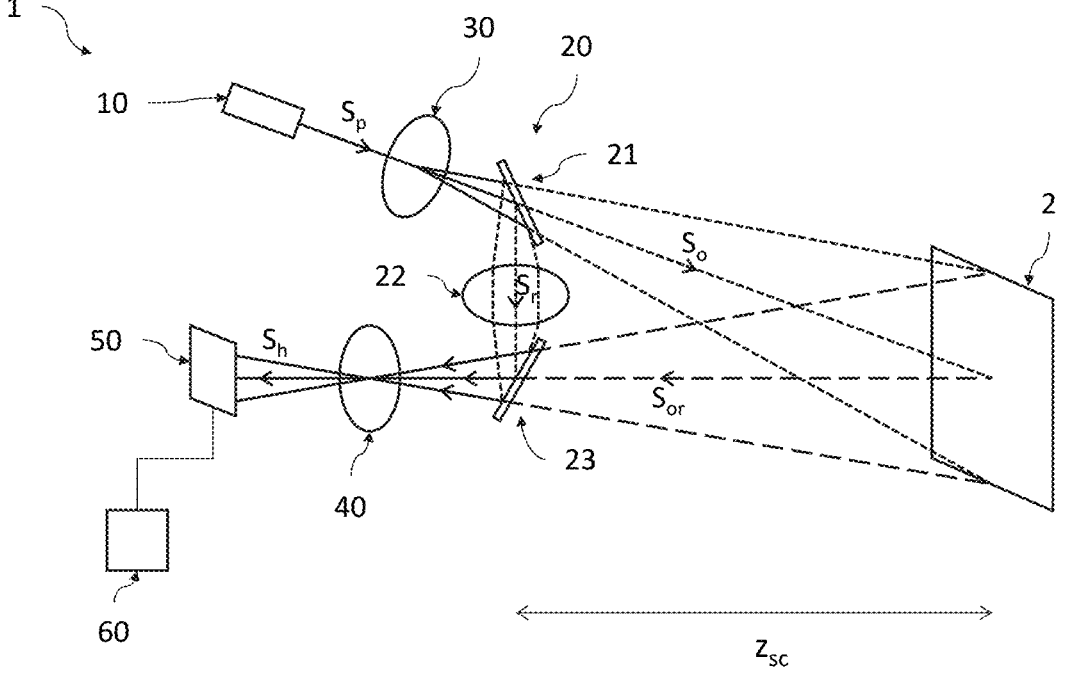
FIG. 1, which has already been described, is a schematic and partial view of a flash imager system according to one example of the prior art.

In this regard, FIG. 2B illustrates such an imager system 1, this imager system being similar to that of FIG. 1, but differing therefrom in that it comprises a reflector 42 configured to reflect, in the direction of the scene 2, a portion $S_{or,nc}$ of the backscattered object signal $S_{or}$, which portion is not collected by the collecting optical element 41, and in that the processing unit 60 is configured to determine the distance $z_{sc}$ of the illuminated scene 2 on the basis of the secondary beat frequency $f_{b(2)}$ of the heterodyne signal $S_h$.

Unlike the imager system 1 of FIG. 2A, the imager system 1 according to this variant comprises an optical device 30 for projecting the object signal $S_o$ in the direction of the scene so as to illuminate all of it simultaneously. Moreover, the optical device 20 also comprises at least one shaping optical element 22, which is located on the optical path of the reference signal $S_r$ between the splitting optical element 21 and the recombining optical element 23. This allows the light beam of the reference signal $S_r$ to be shaped with a view to improving its spatial superposition with the light beam of the collected portion $S_{or,c}$ of the backscattered object signal $S_{or}$. It also comprises an imaging optical device 40 configured to transmit the portion $S_{or,c}$ of the backscattered object signal $S_{or}$ and to form the image of the illuminated scene 2 in the detection plane of the photodetector 50. These optical elements and devices are similar to those described in document WO2021/144357A1 and are therefore not described in detail here.

Lastly, the photodetector 50 is a matrix-array photodetector, and comprises a matrix array of detection pixels lying in a reception plane. It may be a CMOS photodetector (or even a CCD photodetector). The reception plane of the matrix-array photodetector 50 is located in a conjugate plane of the scene by the imaging optical device 40 (to within the depth of field). In other words, the image of the scene 2 is formed in the reception plane of the matrix-array photodetector 50. Each detection pixel is intended to receive the heterodyne signal $S_h$.

Figure 3A:
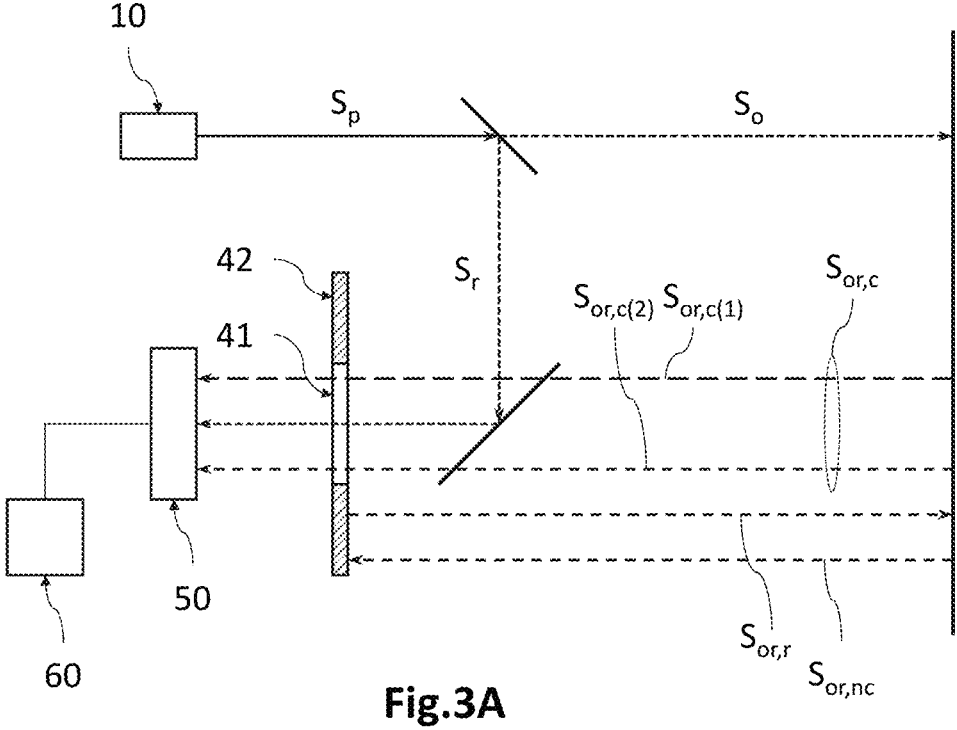
FIG. 3A is a schematic and partial view of an imager system similar to that of FIG. 2A, in which the various optical signals are shown, and in particular the object signal $S_{or}$ backscattered by the scene, a portion $S_{or,c(1)}$ of which is collected directly by the collecting optical element, and another portion $S_{or,nc}$ of which is not collected then is reflected by a reflector in the direction of the scene.

The operation of the imager system 1 will now be described with reference to FIGS. 3A and 3B, where FIG.

Figure 3B:
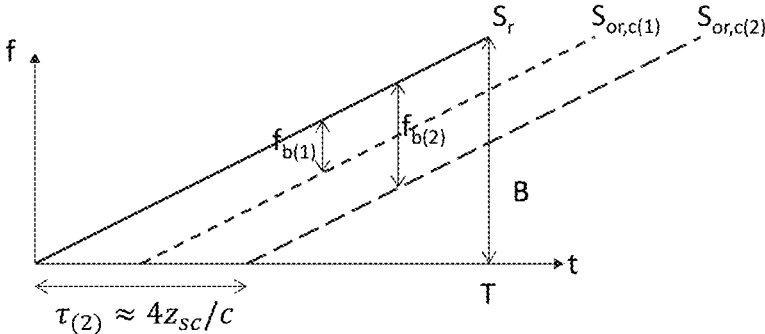
FIG. 3B illustrates a variation in the optical frequency of various signals, including the reference signal $S_r$, the portion $S_{or,c(1)}$ directly collected by the collecting optical element (first echo), and the portion $S_{or,c(2)}$ reflected by the reflector (second echo), thus allowing the principal beat frequency $f_{b(1)}$ and secondary beat frequency $f_{b(2)}$ of the heterodyne signal $S_h$ to be seen.
Figure 5A:
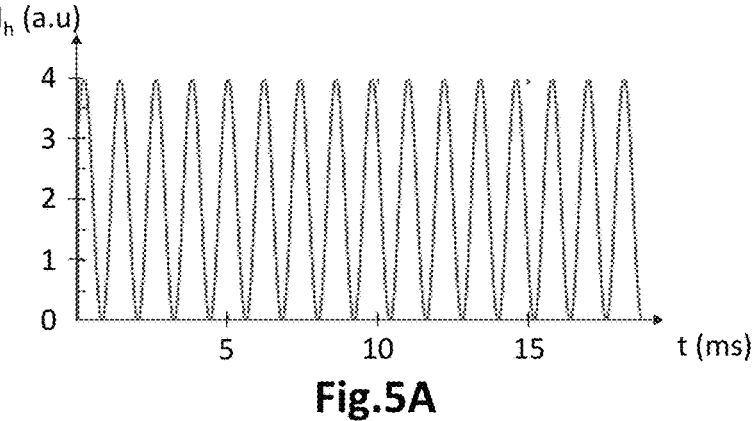
FIGS. 5A and 5B illustrate heterodyne signals $S_h$ detected by an imager system according to one example of the prior art, for two objects located at different distances.
Figure 5B:
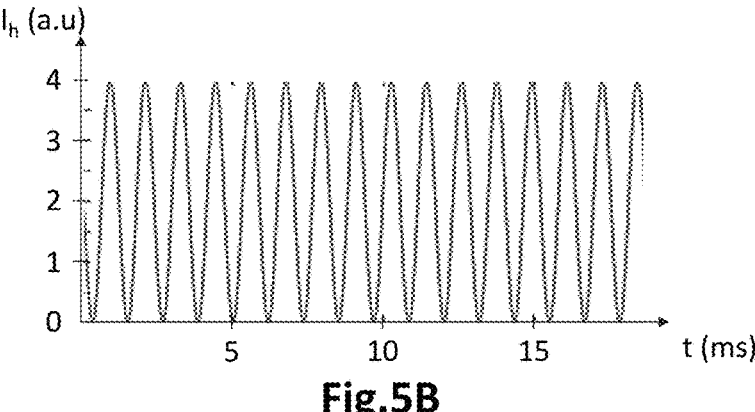
Figure 5C:
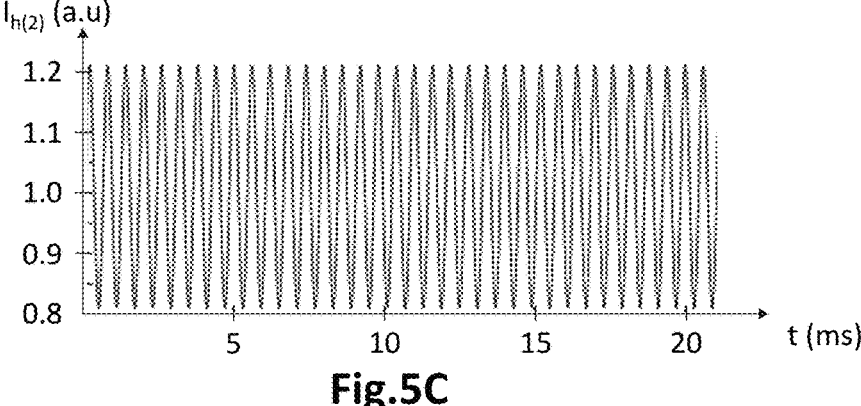
FIGS. 5C and 5D illustrate heterodyne signals $S_h$ detected by an imager system according to one embodiment, for the same two objects located at different distances.
Figure 5D:
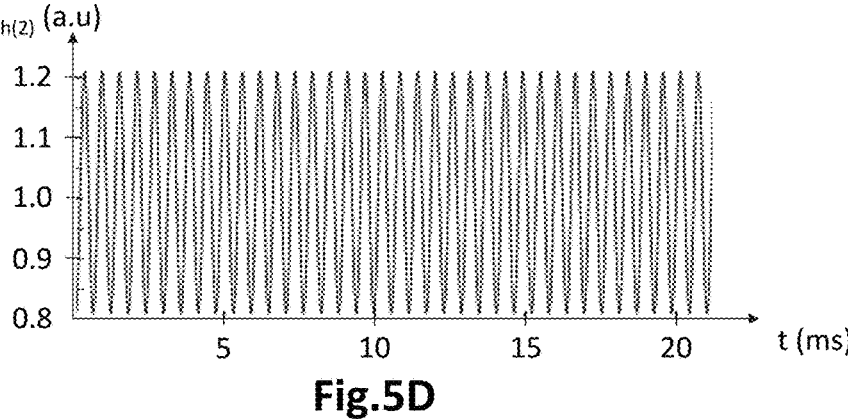

3A is a schematic and partial view of an imager system 1 similar to that of FIG. 2A, allowing the various optical signals that are present to be seen, and where FIG. 3B illustrates the variation as a function of time in the frequency of various optical signals, allowing the principal beat frequency $f_{b(1)}$ and secondary beat frequency $f_{b(2)}$ to be seen.

The optical source 10 emits the coherent, frequency-modulated and continuous-wave primary signal $S_p$, a portion (object signal $S_o$) of which is transmitted by the splitting optical element 21 in the direction of the scene 2 with a view to illuminating one point. A portion of the primary signal $S_p$ is directed in the direction of the photodetector 50 and forms the reference signal $S_r$.

The scene 2 backscatters a portion of the object signal $S_o$ which then forms the backscattered object signal $S_{or}$. The latter comprises a portion $S_{or,c}$ that is collected by the collecting optical element 41, and a portion $S_{or,nc}$ that is not collected by the collecting optical element 41. The not collected portion $S_{or,nc}$ may however be reflected by the reflector 42 in the direction of the scene 2, thereby forming, in return, the reflected signal $S_{or,r}$, a portion of which is then backscattered again by the scene 2 and then collected by the collecting optical element 41.

As a result, the collecting optical element 41 collects a portion $S_{or,c}$ of the backscattered object signal $S_{or}$, which portion is formed from light beams $S_{or,c(1)}$ that have been collected directly without having been reflected by the reflector 42 (and which is called the 'first echo' below), and from light beams $S_{or,c(2)}$ that have been reflected by the reflector 42 before subsequently being collected (and which is called the 'second echo' below).

The recombining optical element 23 thus receives the collected portion $S_{or,c}$ of the backscattered object signal $S_{or}$ and the reference signal $S_r$. It will be noted that the light beams that have been or will be collected by the collecting optical element 41 are called the collected portion $S_{or,c}$. The signals $S_{or,c}$ and $S_r$ are directed in the direction of the photodetector 50 along the same optical axis and in such a way as to be at least partially superposed with each other. They interfere with each other and form the heterodyne signal $S_h$.

As a result thereof the received heterodyne signal $S_h$ comprises a principal component $S_{h(1)}$ associated with the first echo $S_{or,c(1)}$ and having a beat frequency $f_{b(1)}$, and a secondary component $S_{h(2)}$ associated with the second echo $S_{or,c(2)}$ and having a beat frequency $f_{b(2)}$ different from $f_{b(1)}$. The secondary component $S_{h(2)}$ has an amplitude that is generally smaller than that of the principal component $S_{h(1)}$, insofar as the diffuse reflectance of the scene is lower than 1, and insofar as the reflector 42 does not collect all of the light backscattered by the scene and not collected by the collecting optical element 41.

The beat frequency $f_{b(1)}$ between the reference signal $S_r$ and the first echo $f_{oc,r(1)}$ is equal to: $f_{b(1)} = \tau_{(1)} B/T = ((2z_{sc} - z_r)/c) \times (B/T)$. The beat frequency $f_{b(2)}$ between the reference signal $S_r$ and the second echo $f_{oc,r(2)}$ is equal to: $f_{b(2)} = \tau_{(2)} B/T = ((4z_{sc} - z_r)/c) \times (B/T)$. Thus, if the distance $z_r$ of the reference channel is neglected, the frequency $f_{b(2)}$ is equal to $2 \times f_{b(1)}$. As for the distance resolution $\Delta z_{sc}$, it is independent of the distance $z_r$, and is equal to $c/2B$ when it is defined using the beat frequency $f_{b(1)}$, but is equal to $c/4B$ when it is defined using the beat frequency $f_{b(2)}$. Thus, the distance resolution $\Delta z_{sc}$ in the context of the invention is improved by a factor of 2 with respect to the conventional situation in which the distance resolution is based only on use of the beat frequency $f_{b(1)}$.

The processing unit 60 then determines the beat frequency $f_{b(2)}$ of the secondary component $S_{h(2)}$ of the detected heterodyne signal $S_h$, and then deduces therefrom the distance $z_{sc}$ of the scene 2. As indicated above, the beat frequency $f_{b(2)}$ may be determined in the time domain by counting the number of oscillations in the heterodyne signal over the period T, or in the frequency domain via fast Fourier transform.

In the case of a method for determining beat frequency by counting oscillations, one approach consists in firstly determining the beat frequency $f_{b(1)}$ of the principal component $S_{h(1)}$ of the heterodyne signal, by counting the oscillations in the received heterodyne signal $S_h$. Subsequently, electronic bandpass filtering is applied to the heterodyne signal $S_h$ in a spectral band excluding the beat frequency $f_{b(1)}$ and containing the beat frequency $f_{b(2)}$ of the secondary component $S_{h(2)}$ of the heterodyne signal. It is then possible to determine the beat frequency $f_{b(2)}$ by counting the oscillations in the filtered heterodyne signal. It will be noted that the electronic filter may be fixed or adjustable depending on the distance range of the scene. When the spectral band is fixed and predefined, it is then not necessary to determine the value of the beat frequency $f_{b(1)}$. In contrast, determining the value of the beat frequency $f_{b(1)}$ beforehand allows a narrower filter bandwidth and therefore a more precise measurement of the frequency $f_{b(2)}$ to be achieved, and allows a broader spectral range to be measured.

It will be noted that the received heterodyne signal $S_h$ may also comprise an additional component $S_{h(3)}$ associated with interference between the first echo $S_{or,c(1)}$ and the second echo $S_{or,c(2)}$, with a beat frequency $f_{b(3)}$. The amplitude of this component $S_{h(3)}$ may be comparable to that of the component $S_{h(1)}$ in particular when the amplitude of the reference signal $S_r$ and the amplitude of the first echo $S_{or,c(1)}$ are similar. The beat frequency $f_{b(3)}$ is proportional to $2z_{sc}$, this being close to $f_{b(1)}$ which is proportional to $2z_{sc}-z_r$. Thus, the electronic filtering preferably blocks at least the two beat frequencies $f_{b(1)}$ and $f_{b(3)}$, for example by blocking a continuous spectral band including the values $f_{b(1)}$ and $f_{b(3)}$.

In the case of a method for determining beat frequency via fast Fourier transform (FFT), the processing unit performs an FFT of the received heterodyne signal $S_h$, then identifies the peak of the beat frequency $f_{b(1)}$ and the peak of the beat frequency $f_{b(2)}$. This spectral analysis may be performed by an algorithm or an electrical circuit. As indicated above, a portion of the electrical circuit of the processing unit may be located in the detection pixels, or be located in a unit separate from these pixels, which unit may be integrated into a structure comprising the matrix-array photodetector or be remotely located in a computer.

Next, knowing the value of the beat frequency $f_{b(2)}$, the processing unit 60 determines the distance $z_{sc}$ of the scene using the relationship $z_{sc}=cTf_{b(2)}/4B$, with a distance resolution $\Delta z_{sc}=c/4B$, which distance resolution is improved by a factor of 2 with respect to that associated with the beat frequency $f_{b(1)}$. Specifically, the measurement is here based on a double there-and-back trip of the object signal and not on a single there-and-back trip.

Thus, the imager system 1 according to the invention has the advantage of determining the distance $z_{sc}$ of the scene 2 with a distance resolution $\Delta z_{sc}$ improved by a factor of 2, both in single-point mode and in flash mode. This is obtained by collecting the second echo $S_{or,c(2)}$ of the backscattered object signal $S_{or}$, which was previously reflected by the reflector 42 then backscattered again by the scene 2, and by exploiting the beat frequency $f_{b(2)}$ of the component $S_{h(2)}$ of the heterodyne signal $S_h$. Thus, the chirp B of the primary signal $S_p$ is not modified, this avoiding any increase in the consumption of the imager system 1 and any degradation in its performance (because of the non-linearity of the chirp or of a modulation of the optical power emitted by the optical source 10). In addition, the complexity of the electronics that the processing unit 60 employs to detect the beat frequencies $f_{b(1)}$ and $f_{b(2)}$ is not significantly increased.

A concrete example of determination of the distance $z_{sc}$ with an improved resolution $\Delta z_{sc}$, on the basis of measurement of the beat frequency $f_{b(2)}$ of the secondary component $S_{h(2)}$ of the heterodyne signal $S_h$, will now be described with reference to FIGS. 4A to 4C. In this example, the primary signal $S_p$ has a chirp B equal to 7.5 GHz, a period T equal to 30 ms, a wavelength $\lambda$ of 633 nm, and the scene is located at a distance $z_{sc}$ of 50 cm, the path length $z_r$ of the reference signal $S_r$ being negligible with respect to the distance $z_{sc}$. The amplitude of the first echo $S_{or,c(1)}$ is considered to be equal to 1% of the amplitude of the reference signal $S_r$, and the amplitude of the second echo $S_{or,c(2)}$ is considered to be equal to 0.09% of the amplitude of the reference signal $S_r$. Lastly, the various sources of noise in the imager system are not taken into account, insofar as the objective of this example is to illustrate the improvement in the distance resolution $\Delta z_{sc}$. FIG. 4A illustrates the intensity $I_h$ of the heterodyne signal $S_h(t)$ received and detected by the photodetector 50. It will be noted that the signal is not a perfect sinusoid since it is the result of interference between 3 waves and not of interference between 2 waves.

In the case where the method of counting oscillations is used to determine the beat frequency $f_{b(2)}$, the number $N_{(1)}$ of oscillations in the heterodyne signal $S_h(t)$ is counted inasmuch as it is equal to the number of oscillations in the principal component $S_{h(1)}$. In this example, $N_{(1)}$ is counted equal to 24 over a period T, and it is deduced therefrom that the principal beat frequency $f_{b(1)}=N_{(1)}/T=800$ Hz. Next, an electronic bandpass filter that excludes the frequency $f_{b(1)}$ is applied to the heterodyne signal $S_h(t)$, and the filtered signal is obtained. FIG. 4B illustrates the intensity $I_{hf}$ of the obtained filtered signal. This corresponds to the secondary component $S_{h(2)}(t)$ associated with the second echo $S_{or,c(2)}$. The number $N_{(2)}$ of oscillations in the component $S_{h(2)}(t)$ is then counted, it here being equal to 49 over a period T, this corresponding to a secondary beat frequency of about $f_{b(2)}=N_{(2)}/T=1633$ Hz. It is then possible to determine the distance of the scene, which is here equal to 49 cm, using the relationship $z_{sc}=N_{(2)}c/4B$, this distance $z_{sc}$ being computed with a resolution $\Delta z_{sc}=c/4B$ equal to only 1 cm.

In the case where the FFT method is used to determine the beat frequency $f_{b(2)}$, an FFT is performed on the detected heterodyne signal $S_h(t)$ illustrated in FIG. 4A, the obtained spectrum of which is illustrated in FIG. 4C. The latter indeed shows the principal frequency $f_{b(1)}$ and the secondary frequency $f_{b(2)}$. Here the secondary frequency $f_{b(2)}$ is equal to about 1633 Hz, this allowing the distance of the scene, which is equal to 49 cm, to be determined, using the relationship $z_{sc}=f_{b(2)}cT/4B$, with a distance resolution $\Delta z_{sc}=c/4B$ also equal to 1 cm.

A comparison of the determination of the distance $z_{sc}$ with a resolution $\Delta z_{sc}$ in the case of an approach according to the prior art (i.e. based on the beat frequency $f_{b(1)}$) and in the case of the invention (i.e. based on the beat frequency $f_{b(2)}$) will now be described, with reference to FIGS. 5A to 5D, for two objects, one of which is located at a distance of 50 cm and the other of which is located at a distance of 51.5 cm.

In the case of an imager system according to the prior art, the imaging optical device comprises no reflector according to the invention, and hence the backscattered and collected object signal $S_{or}$ comprises only beams (first echo) that have made a single there-and-back trip with respect to the scene 2. Thus, the detected heterodyne signals (cf. FIG. 5A for the object located at 50 cm, and FIG. 5B for the object located at 51.5 cm), are perfect sinusoids generated by interference between 2 waves (the reference signal $S_r$ and the backscattered object signal $S_{or}$). In the case of the object at 50 cm, a number N of 24 oscillations is counted, i.e. a distance $z_{sc}$=Nc/2B of 48 cm with a resolution $\Delta z_{sc}$=c/2B of 2 cm. In the case of the object at 51.5 cm, a number N of 24 oscillations is counted, i.e. a distance $z_{sc}$ of 48 cm with a resolution $\Delta z_{sc}$ of 2 cm. Hence, unsurprisingly, the imager system according to this prior-art example is not able to discriminate between two objects separated by a distance smaller than its distance resolution.

In the case of the imaging system according to the invention, the imaging optical device 40 comprises the reflector 44, and hence the collected backscattered object signal $S_{or}$ comprises the first echo $S_{or,c(1)}$ formed from beams that have made a single there-and-back trip with respect to the scene, and the second echo $S_{or,c(2)}$ formed from beams that have made a double there-and-back trip. Thus, the detected heterodyne signal $S_h(t)$ is filtered and the second component $S_{h(2)}(t)$ obtained (cf. FIG. 5C for the object located at 50 cm, and FIG. 5D for the object located at 51.5 cm). In the case of the object at 50 cm, a number $N_{(2)}$ of 49 oscillations is counted, i.e. a distance $z_{sc}$=$N_{(2)}$c/4B of 49 cm with a resolution $\Delta z_{sc}$=c/4B of 1 cm. In the case of the object at 51.5 cm, a number $N_{(2)}$ of 50 oscillations is counted, i.e. a distance $z_{sc}$ of 50 cm again with a resolution $\Delta z_{sc}$ of 1 cm. Thus, the improvement in the distance resolution $\Delta z_{sc}$ achieved by collecting backscattered-object-signal beams that have made a double there-and-back trip with respect to the scene (second echo) indeed allows two objects separated by a small distance to be discriminated between (or a small variation in the distance of the same object between two successive measurement times to be detected).

According to one embodiment, the amplitude of the reference signal $S_r$ may be adjusted to facilitate the determination of the frequency $f_{b(2)}$. Thus, in the case where the frequency $f_{b(2)}$ is determined using the method of counting oscillations, it is advantageous to optimize the contrast of the oscillations in the component $S_{h(2)}$ of the heterodyne signal $S_h$, and therefore to adjust the amplitude of the reference signal $S_r$ to a value substantially equal to the amplitude of the second echo $S_{or,c(2)}$. It is also possible to maximize the amplitude of the oscillations in the component $S_{h(2)}$ by increasing the amplitude of the reference signal $S_r$, for example via a servocontrol loop that acts on the amplitude of the reference signal $S_r$. Care will be taken not to saturate the heterodyne signal $S_h$ received and detected by the photodetector 50 (i.e. the unfiltered detected total signal comprising all the frequency components).

FIGS. 6A to 6D are schematic views of the reflector 42 according to various variant embodiments.

Figure 6A:
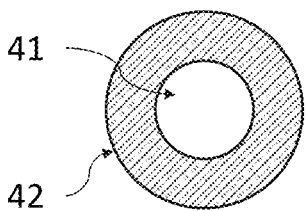
FIGS. 6A to 6D are schematic views of examples of the reflector of an imager system according to one embodiment, in which the reflector is a ring encircling the collecting optical element (FIG. 6A); is a square attached to or located away from the collecting optical element (FIG. 6B); is located by the photodetector (FIG. 6C); is formed from retroreflective areas separated from one another by a transparent area (FIG. 6D)
Figure 6B:
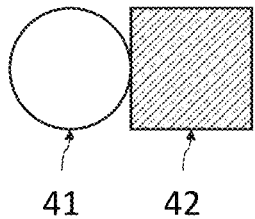
Figure 6B:
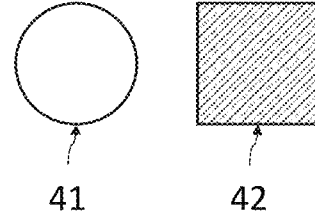

The reflector 42 may be located at the collecting optical element 41, for example in a manner coplanar therewith, and have a ring (crown) shape that continuously encircles it (cf. FIG. 6A). It may be formed from annular segments partially encircling the collecting optical element 41. As a variant, it may have any shape (here a square shape) and be joined or not joined to the collecting optical element 41 (FIG. 6B). In these examples, the reflector 42 is preferably formed of a continuously reflective or retroreflective surface.

Figure 6C:
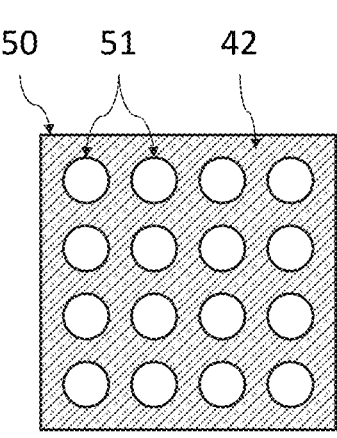

The reflector 42 may not be located in the plane of the collecting optical element 41, and may be located upstream or downstream thereof. For example, it may be located by the photodetector, i.e. in the detection plane or close to the detection plane, irrespectively of whether the photodetector 50 is a photodiode or a matrix array. In this regard, FIG. 6C illustrates the situation in which the photodetector is a matrix-array photodetector (flash imager system 1) and comprises a matrix array of detection pixels 51 with a fill factor lower than one—the reflector 42 may be located in the non-photosensitive regions of the matrix-array of detection pixels 51. In this particular case and when the reflector 42 is retroreflective, the corner-cube retroreflectors of the reflector 42 preferably have a lateral dimension very much greater than the wavelength, for example 10 times greater than the wavelength of the primary signal, so that the corner-cube retroreflectors do not diffract.

Figure 6D:
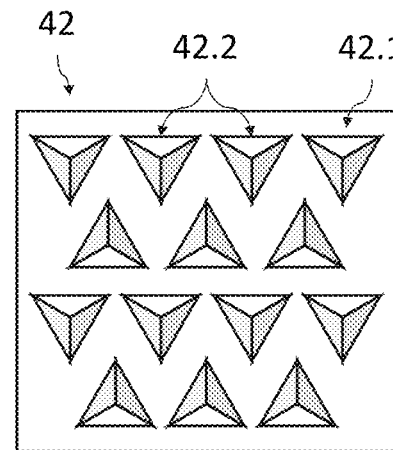

Moreover, the reflector 42 may be formed from a continuously reflective or retroreflective area, or be formed from reflective or retroreflective areas 42.2 that are not contiguous and that are separated from one another by an area 42.1 that is transparent or reflective to the wavelength of the optical signals of interest, as illustrated in FIG. 6D. In the case where the area 42.1 is transparent, this embodiment is particularly advantageous when the reflector 42 is located upstream of the collecting optical element 41 and is passed through by the collection optical axis (cf. FIGS. 10A and 10B). In this regard, the reflector 42 may be formed from a central area that is passed through by the collection optical axis, this central area comprising the reflective or retroreflective areas 42.2 that are separated from one another and encircled by a transparent area 42.1, and from a peripheral area that encircles the central area and in which the reflective or retroreflective areas 42.2 are joined to one another.

Figure 7A:
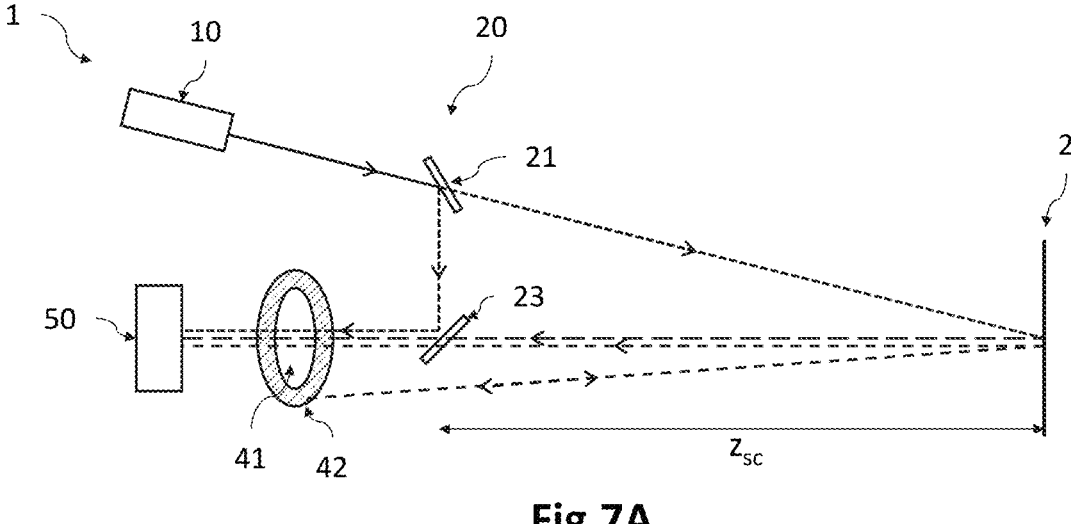
FIG. 7A is a schematic and partial view of an imager system according to one embodiment in which said imager system is of single-point type and in which the reflector is retroreflective.
Figure 7B:
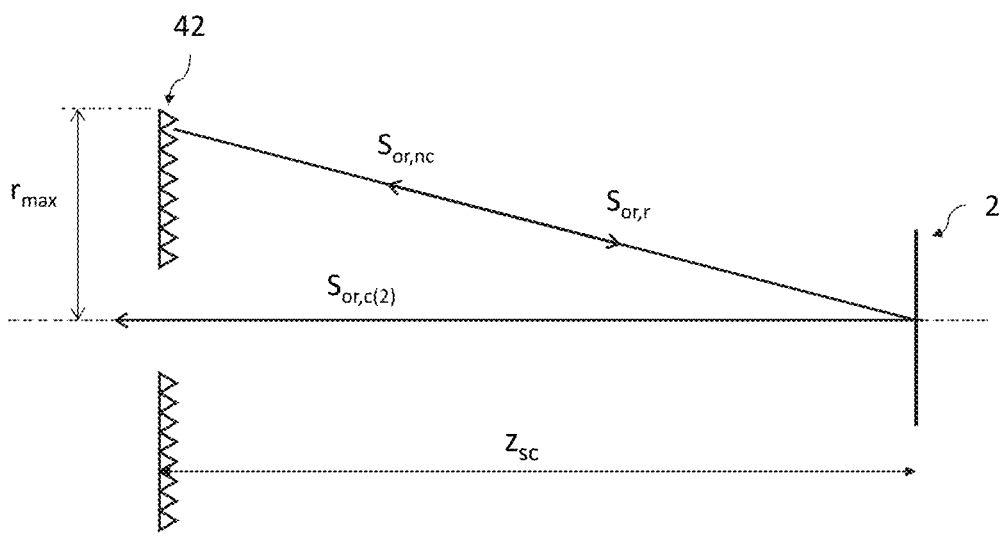
FIG. 7B is a detailed view of FIG. 7A showing the backscattered and not collected signal $S_{or,nc}$, the reflected signal $S_{or,r}$ and the second echo $S_{or,c(2)}$.

FIG. 7A is a schematic and partial view of an imager system 1 according to a single-point embodiment, in which the reflector 42 is retroreflective. FIG. 7B illustrates a detail of FIG. 7A allowing a condition on the maximum distance $r_{max}$ of the lateral edge of the reflector 42 with respect to the collection optical axis to be seen.

According to one embodiment, the reflector 42 is retroreflective, in the sense that incident light beams are reflected with an axis of reflection identical to the axis of incidence. Thus, the light beam backscattered by a point of the scene 2 and reflected by the retroreflective reflector 42 is returned to the same point of the scene 2 or to within its immediate proximity. Therefore, such a reflector 42 makes it possible not to mix, among the light beams of the collected signal $S_{or,c}$, light beams coming from a plurality of different points of the scene 2, and therefore not to worsen the lateral resolution of the imager system 1. In the case of a single-point imager system 1, this allows the determination of the distance $z_{sc}$ not to be disrupted by light beams coming from objects located at other distances. Furthermore, in the case of a flash imager system 1, this thus avoids worsening the quality or the spatial resolution of the determined distance map.

The reflector 42 is arranged facing the optical axis of the collecting optical element 41, such that it has an outer lateral edge located at a maximum distance $r_{max}$ from this optical axis. Preferably, this maximum distance $r_{max}$ is smaller than $\sqrt{(cz_{sc}/2B)}$, so as not to worsen the distance resolution $\Delta z_{sc}$ of the imager system 1. Specifically, as illustrated in FIG. 7B, should a light beam of the not collected portion $S_{or,nc}$ be retroreflected at the edge of the reflector 42, and then backscattered along the optical axis of the collecting optical element 41, it would then cover a distance of $z_{sc}+\sqrt{(z_{sc}^2+r_{max}^2)}$, and not of $2z_{sc}$, which would cause an error of the order of $r_{max}^2/2z_{sc}$ under the assumption that $r_{max} \gg z_{sc}$.

Therefore, this error $r_{max}^2/2z_{sc}$ should advantageously be less than the distance resolution $\Delta z_{sc}$, which is equal to c/4B, this leading to the condition $r_{max}<\sqrt{(cz_{sc}/2B)}$. It will be noted that this condition is not very restrictive, insofar as $r_{max}<10$ cm is obtained for $z_{sc}=50$ cm and B=7 GHz.

The reflector 42 has an area configured to maximize the number of photons of the signal $S_{or,nc}$ that are intercepted and then reflected, this accordingly increasing the amplitude of the second echo $S_{or,c(2)}$ and therefore the distance range of the imager system 1, without however decreasing the compactness of the reception module of the imager system 1. Whatever the case may be, it is advantageous for the reflector 42 to have dimensions that meet the abovementioned condition on the maximum distance $r_{max}$ of the lateral edge.

Figure 8A:
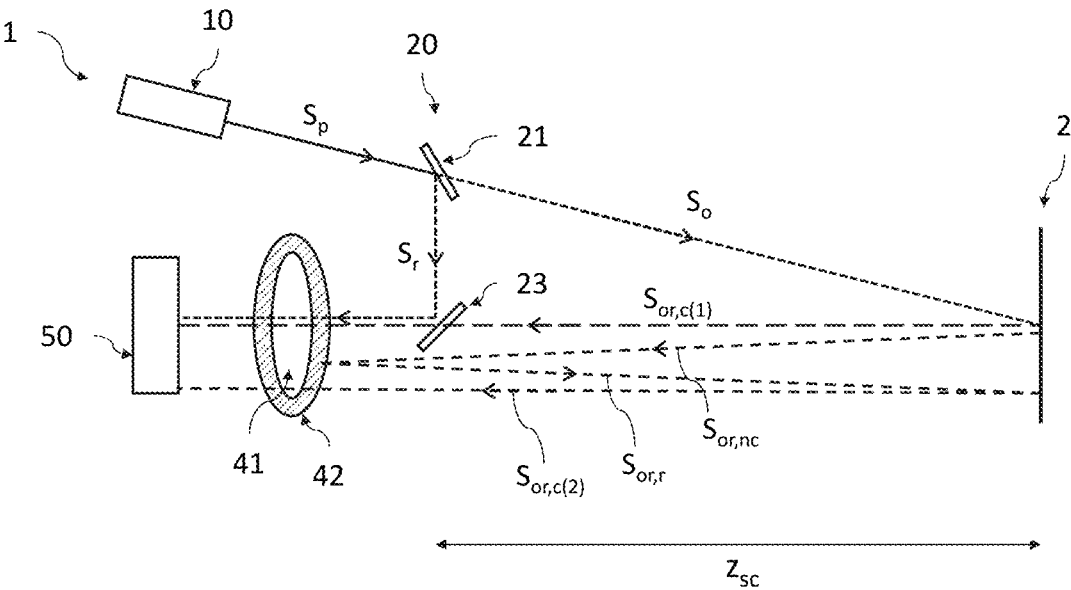
FIG. 8A is a schematic and partial view of an imager system according to one embodiment in which said imager system is of single-point type and in which the reflector is not retroreflective.
Figure 8B:
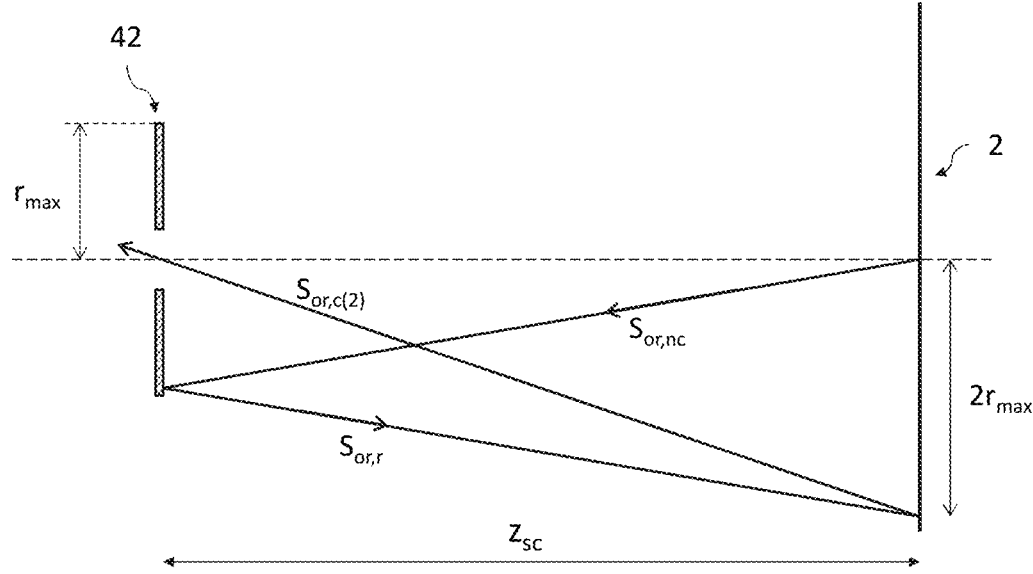
FIG. 8B is a detailed view of FIG. 8A showing the backscattered and not collected signal $S_{or,nc}$, the reflected signal $S_{or,r}$ and the second echo $S_{or,c(2)}$.

FIG. 8A is a schematic and partial view of an imager system 1 according to one embodiment, in which the reflector 42 is not retroreflective, i.e. it is solely reflective. FIG. 8B illustrates a detail of FIG. 8A allowing a condition on the maximum distance $r_{max}$ of the lateral edge of the reflector 42 with respect to the collection optical axis to be seen.

A light beam incident on the reflector 42 is therefore not reflected along an axis of reflection identical to the axis of incidence, but obeys Snell's law of reflection. It is therefore reflected in the direction of a point different from the one from which the light beam of the portion $S_{or,nc}$ of the backscattered signal $S_{or}$ originated. For a light beam that is reflected from the reflector 42 at the distance $r_{max}$, it will be noted that the distance between these two points of the scene is of the order of $2r_{max}$ (for a scene substantially orthogonal to the optical axis). As a result, the preceding condition on the distance $r_{max}$ of the outer lateral edge of the reflector 42 is modified and becomes: $r_{max}<\sqrt{(cz_{sc}/6B)}$. This condition is still not very restrictive since $r_{max}<6$ cm is obtained in the case where $z_{sc}=50$ cm and B=7 GHz. Whatever the case may be, it is preferable to reserve the use of a non-retroreflective reflector 42 for a single-point imager system 1. Moreover, care will be taken to ensure that the angular separation between the two illuminated points of the scene 2 remains less than the individual-field-of-view (iFOV) angular resolution of the collecting optical element 41, with the condition 2 a tan $(r_{max}/z_{sc})<$iFOV, so as not to worsen lateral resolution. It will be noted that the field of view (FOV) of the collecting optical element 41 is the angle in which the photodetector 50 is sensitive to the portion $S_{ret,c}$ of the object signal $S_{ret}$ backscattered through the collecting optical element 41.

Figure 9:
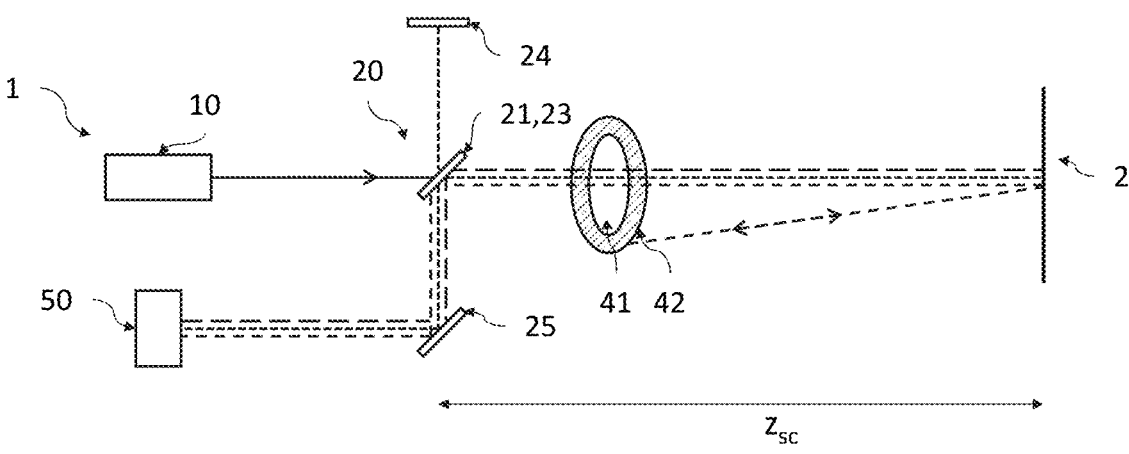
FIG. 9 is a schematic and partial view of an imager system according to one embodiment in which said imager system is of single-point type and in mono-static configuration.

According to one embodiment, the imager system 1 may have what is called a mono-static configuration, in the sense that the optical axis of the illumination of the scene 2 and the collection optical axis are collinear. In this regard, FIG. 9 is a schematic and partial view of such an imager system 1, here of single-point type, but this configuration may also be implemented for a flash imager system 1. Moreover, the reflector 42 is here retroreflective.

This configuration is for example based on a Michelson-interferometer architecture. The imager system 1 comprises an additional mirror 24 placed on the optical path of the reference signal $S_r$, and the collecting optical element 41 (and the reflector 42) is (are) located between the scene 2 and the splitting optical element 21 (and therefore upstream of the recombining optical element 23).

Thus, the splitting optical element 21 splits the primary signal $S_p$ into the object signal $S_o$ that is transmitted in the direction of the scene, and into the reference signal $S_r$ that is reflected in the direction of the additional mirror 24. The latter reflects the reference signal $S_r$ in the direction of the recombining optical element 23. A portion $S_{or,c}$ of the backscattered object signal $S_{or}$ is collected by the collecting optical element 41, then is reflected by the splitting optical element 21 in the direction of a steering mirror 25. Thus, the splitting optical element 21 performs the function of recombining the reference signal $S_r$ and the collected portion $S_{or,c}$ of the backscattered object signal $S_{or}$, and is denoted "21, 23" in the figure.

The imager system 1 here has the advantage of facilitating the detection and the determination of the distance $z_{sc}$ of objects having a high specular component, that is to say that light is backscattered by the object in question from the scene in a backscatter cone (angular distribution of the backscattered luminous intensity) centered on a principal direction, this direction possibly being close to the specular reflection direction. Specifically, in the case of a bi-static imager system 1 such as presented above (FIGS. 2A-2B and FIG. 6A-7A), the second echo $S_{or,c(2)}$ could be backscattered mainly in the direction of the optical source 10, and slightly in the direction of the collecting optical element 41, thus reducing the amplitude of the collected signal $S_{or,c(2)}$, and therefore the ability of the imager system 1 to detect this type of object in the scene 2. This is not the case for a mono-static imager system 1, insofar as the second echo is mainly returned toward the collecting optical element 41 and the reflector 42 (the angular indicatrix is narrow). Moreover, this mono-static configuration of an imager system 1 has the advantage of reducing or even eliminating shadowing effects in the determined distance map, by the very fact that these two optical axes are coincident.

According to one embodiment, the reflector 42 is reflective or retroreflective, and is formed from reflective or retroreflective areas that are not contiguous and that are separated from one another by a transparent area. The reflector 42 may then be located upstream of the collecting optical element 41, in the sense that the collection optical axis passes through the reflector 42. In this regard, FIGS. 10A and 10B are schematic and partial views of such an imager system 1, in a bi-static configuration (FIG. 10A) and in a mono-static configuration (FIG. 10B).

Figure 10A:
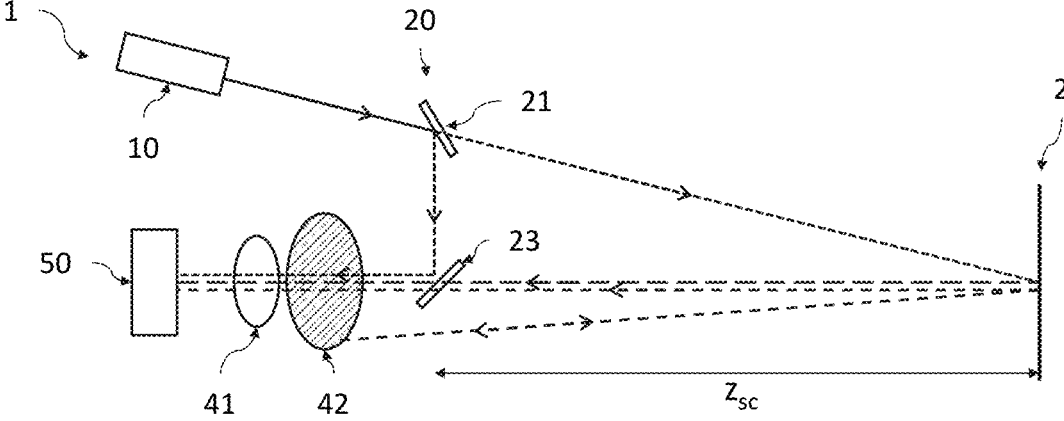
FIGS. 10A and 10B are schematic and partial views of an imager system according to variant embodiments, in which the reflector is located upstream of the collecting optical element and is passed through by the optical axis thereof, in bi-static configuration (FIG. 10A) and in mono-static configuration (FIG. 10B).

In the example of FIG. 10A, the imager system 1 is similar to that of FIG. 6A and differs therefrom essentially in that the reflector 42 is not coplanar with the collecting optical element 41 but is located upstream thereof. Moreover, the collecting optical element 41 and the reflector 42 are here located downstream of the recombining optical element 23 but could be located upstream.

Figure 10B:
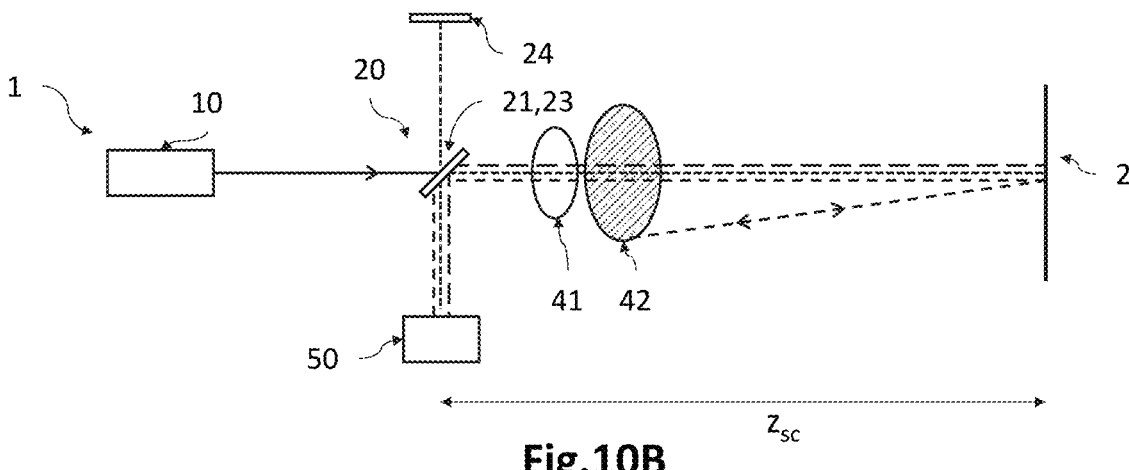

In the example of FIG. 10B, the imager system 1 is similar to that of FIG. 9 and differs therefrom essentially in that the reflector 42 is also located upstream of the collecting optical element 41. It will be noted that the optical element 21 (denoted "21, 23" in the figure) is both the splitting optical element 21 and the recombining optical element 23.

An imager system 1 according to this embodiment has the advantage of decreasing the lateral bulk of the receiving module with respect to the examples of FIGS. 2A and 2B.

Particular embodiments have just been described. Various variants and modifications will seem obvious to anyone skilled in the art. The imager system 1 may thus have a free-space configuration or a guided-optic configuration, as described in document WO2021/144357A1 mentioned above.

The invention claimed is:

1. An FMCW lidar imager system, configured to determine a distance $z_{sc}$ separating it from a scene, comprising:

a coherent light source, configured to emit a frequency-modulated continuous-wave primary signal $S_p$;

a splitting and recombining optical device, configured to split the primary signal $S_p$ into a reference signal $S_r$ that is directed toward a photodetector and into an object signal $S_o$ that is directed toward the scene, which backscatters a portion of the object signal $S_o$, which portion is called the backscattered object signal $S_{or}$; and configured to direct toward the photodetector, along the same optical axis, the reference signal $S_r$ and a portion $S_{or,c}$ of the backscattered object signal $S_{or}$, which portion is collected by a collecting optical element;

the collecting optical element, configured to collect the portion $S_{or,c}$ of the backscattered object signal $S_{or}$;

the photodetector, intended to receive the reference signal $S_r$ and the collected portion $S_{or,c}$ of the backscattered object signal $S_{or,c}$, which interfere to form a heterodyne signal $S_h$;

a processing unit, configured to determine the distance $z_{sc}$ of the scene on the basis of a beat frequency of the heterodyne signal $S_h$;

a reflector configured to reflect, in the direction of the scene, a portion $S_{or,nc}$ of the backscattered object signal $S_{or}$, which portion is not collected by the collecting optical element, the collected portion $S_{or,c}$ of the backscattered object signal $S_{or}$ then being formed from first light beams $S_{or,c(1)}$ that have not been reflected by the reflector and from second light beams $S_{or,c(2)}$ that have been reflected by the reflector then by the scene;

the heterodyne signal $S_h$ therefore having a principal component $S_{h(1)}$ associated with said first light beams $S_{or,c(1)}$, and a secondary component $S_{h(2)}$ associated with said second light beams $S_{or,c(2)}$;

and wherein the processing unit is configured to determine the distance $z_{sc}$ of the scene on the basis of a beat frequency $f_{b(2)}$ of the secondary component $S_{h(2)}$ of the heterodyne signal $S_h$.

2. The imager system as claimed in claim 1, wherein the reflector is retroreflective, so as to reflect incident light beams in the direction of the scene along an axis of reflection identical to their axis of incidence.

3. The imager system as claimed in claim 1, wherein the reflector has a lateral edge located at a maximum distance $r_{max}$ from an optical axis of the collecting optical element, and is dimensioned so that the maximum distance $r_{max}$ is smaller than $\sqrt{(cz_{sc}/2B)}$ when the reflector is retroreflective, where c is the speed of light in vacuum, and B is a variation in the frequency of the primary signal $S_p$ over one period T of the modulation, and so that the maximum distance $r_{max}$ is smaller than $\sqrt{(cz_{sc}/6B)}$ when the reflector is not retroreflective.

4. The imager system as claimed in claim 1, wherein the reflector is located in the plane of the collecting optical element.

5. The imager system as claimed in claim 1, wherein the reflector is located downstream of the collecting optical element, at a level of the photodetector.

6. The imager system as claimed in claim 1, wherein the reflector is located upstream of the collecting optical element and has a collection optical axis passing through it, the reflector then being formed from reflective or retroreflective areas that are separate from one another and that are encircled by an area that is transparent to the wavelength of the primary signal $S_p$.

7. The imager system as claimed in claim 6, wherein the reflector comprises a central area that is passed through by the collection optical axis, in which central area reflective or retroreflective areas that are separate from one another and that are encircled by a transparent area are formed, and a peripheral area that encircles the central area, in which peripheral area the reflective or retroreflective areas are joined to one another.

8. The imager system as claimed in claim 1, said imager system being configured to illuminate only one point of the scene, or being configured to simultaneously illuminate a plurality of points of the scene and then comprising an optical device for projecting the object signal $S_0$ onto the scene with a view to simultaneously illuminate the plurality of points of the scene and an imaging optical device configured to form an image of the illuminated scene in the plane of the photodetector.

9. The imager system as claimed in claim 1, wherein the processing unit determines the beat frequency $f_{b(2)}$ by counting the oscillations in the second component $S_{or,c(2)}$ of the heterodyne signal $S_h$.

10. The imager system as claimed in claim 9, wherein the processing unit is configured to determine a beat frequency $f_{b(1)}$ of the principal component $S_{h(1)}$ of the heterodyne signal $S_h$, then to apply, to the heterodyne signal $S_h$, a bandpass filter that excludes the determined beat frequency $f_{b(1)}$ with a view to obtaining the secondary component $S_{h(2)}$, and lastly to determine the beat frequency $f_{b(2)}$ of the secondary component $S_{h(2)}$.

11. The imager system as claimed in claim 1, wherein the processing unit determines the beat frequency $f_{b(2)}$ via Fourier transform applied to the heterodyne signal $S_h$.

12. The imager system as claimed in claim 1, comprises a mono-static configuration in which an optical axis of illumination of the scene by the object signal $S_o$ is identical to a collection optical axis of the collecting optical element, and comprising a mirror toward which the reference signal $S_r$ is directed by a splitting optical element of the splitting and recombining optical device.

13. The imager system as claimed in claim 1, comprises a bi-static configuration in which an optical axis of illumination of the scene by the object signal $S_o$ is different from a collection optical axis of the collecting optical element.

* * * * *